United States Patent [19]

Heinemann

[11] 4,388,695
[45] Jun. 14, 1983

[54] HARDWARE MEMORY WRITE LOCK CIRCUIT

[75] Inventor: Joseph B. Heinemann, New York, N.Y.

[73] Assignee: Timeplex, Inc., Rochelle Park, N.J.

[21] Appl. No.: 123,368

[22] Filed: Feb. 21, 1980

[51] Int. Cl.³ .............................................. G06F 11/00
[52] U.S. Cl. ................................................... 364/900
[58] Field of Search ... 364/200 MS File, 900 MS File

[56] References Cited

U.S. PATENT DOCUMENTS 3,827,029  7/1974  Schlotterer ........................... 364/200
4,093,986  6/1978  Bodner .................................. 364/200

Primary Examiner—Gareth D. Shaw
Assistant Examiner—John G. Mills
Attorney, Agent, or Firm—Gottlieb, Rackman & Reisman

[57] ABSTRACT

A hardware circuit for protecting against the accidental writing in an area of memory which contains critical data. In order to access the critical data memory area during a write cycle, it is necessary first to control predetermined memory access cycles which include, for example, the writing of predetermined data at a predetermined address. After detection of such a "fictitious" write cycle, the hardware allows the next write cycle to access the critical data memory area.

21 Claims, 1 Drawing Figure

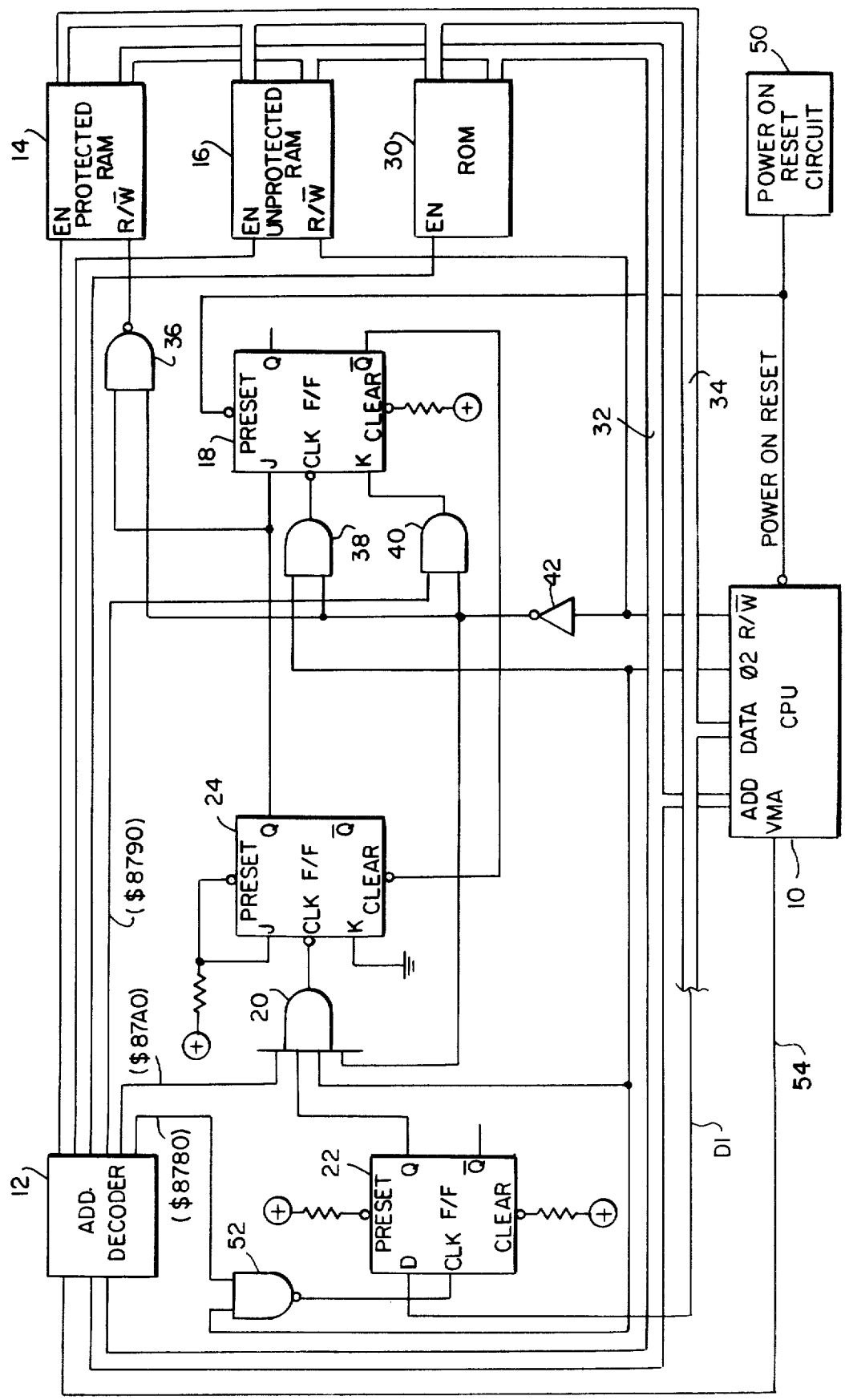

HARDWARE MEMORY WRITE LOCK CIRCUIT

This invention relates to the protection of critical information in data processing systems, and more particularly the prevention of accidental writing in an area of read/write memory which contains critical data.

As used herein, the term "data processing system" refers to any system which includes at least a read/write (RAM) memory, together with a control mechanism for accessing the memory. Typically, the control mechanism is a central processing unit or microprocessor, with the overall system including address and data buses, and a control line for selecting between read and write cycles. Such a data processing system may be a microcomputer, or a microprocessor-based product such as a microwave oven, patient monitoring apparatus, etc.

All data processing systems of this type are known to "crash" occasionally. A crash can be caused by many factors, e.g., power line transients, static discharges from operating personnel, subtle software "bugs", and soft dynamic RAM errors arising from stray alpha particles. Even systems which include battery back-up and which utilize core memory are not immune from such crashes. Once the central processing unit "loses its mind", it may very well jump to a section of the program which controls writing in the memory. When this happens, the previously stored data is lost and start-up procedures must be initiated.

But there is certain data which, if lost, can give rise to all sorts of problems. A typical case is that of a sophisticated statistical multiplexer. Such a device may carry on-line traffic from many sources, and its proper operation is often controlled by manually entered data. If such a multiplexer crashes and this critical data is lost, the device (which is very often un-manned) will remain out of service until some well-trained operator becomes available to manually re-enter the control data via front panel switches. Thus with such a multiplexer, there is a very great need to protect against the accidental erasure of certain critical data in the read/write memory.

Although not as common, there are other addressable (and even non-addressable) elements which may also have to be protected. For example, a system may include a latch, the contents of which are critical to the system operation. There may similarly be an I/O device which if accessed erroneously may create havoc in the system operation.

In the prior art, it is known to protect a critical data memory area through use of a protect switch. Only when the switch is manually set to "unprotect" can data be written into the RAM addresses controlled by the switch; when the switch is in the "protect" state, write pulses are blocked from reaching the memory. This is unquestionably a fail-safe technique, but it relies on and requires operator intervention.

There are also software screening routines, found primarily in software/hardware development systems. In such a system, the user is requested to enter those areas of RAM to be protected. A screening software routine then inspects all RAM write access request and rejects those which are prohibited. This kind of memory protect scheme is not effective in the case of crashes since the whole scheme relies on the proper operation of a software screening routine which, like all others, is not reliable following a crash. To make matters worse, there are some microprocessors which, following the appearance of an invalid operation code in the instruction register (which condition may arise from a crash), write a predetermined data byte into every memory location (a hexadecimal FF in the case of the Motorola 6800). It is apparent that any memory protect scheme which relies only on software cannot be effective.

A third type of prior art protect scheme is that employed in some CRT terminals and computers where an extra bit (or bits) is set or reset depending on whether the particular byte (or block) is protected or not. Whenever a write cycle is attempted, the corresponding bit for the addressed byte is automatically accessed and read; if the bit is set for "write protect", it blocks the write pulse and, in some systems, causes an interrupt to flag the illegal write attempt. There are several shortcomings in such systems. First, no area in memory is always unconditionally protected; since the protect status is under software control, it is less reliable. Second, there is no automatic re-locking after a protected address is accessed during a write cycle. If the protected address remains unlocked after the required write cycle, subsequent erroneous writes may take place. Third, extra hardware is necessary since typically an additional bit is required for each byte to be protected, and extra software is also needed to control the setting and resetting of all of the protect bits. Fourth, such systems are not crash-proof because they do not require special "keys" to control unlocking.

It is an object of my invention to provide a memory or other device protect capability for a data processing system which does not rely on operator intervention, and which is not subject to the shortcomings of software-only protect schemes.

Briefly, in accordance with the principles of my invention, hardware is provided for registering the occurrence of predetermined memory access cycles. Typically, the hardware is designed to detect one or more write cycles involving predetermined addresses and data. Ordinarily, write pulses are blocked from the critical data memory area, but following the occurrence of the predetermined write cycles, a write cycle is permitted in the critical data memory area. The write cycles which thus unlock the critical data memory area may be "fictitious" in the sense that they may not even write anything into any memory address.

The only reason for requiring these predetermined memory accesses is to insure that if the central processing unit is about to control a write cycle in the protected memory area, then it "knows what it is doing". Following detection of the predetermined memory access cycles, only a predetermined number (one, in the illustrative embodiment of the invention) of write cycles are permitted to access the protected memory area. (Write cycles in the unprotected memory area, and read cycles in both memory areas, may always take place even without the prior detection of the unlocking memory access cycles.)

It must be recognized, however, that the unlocking procedure is still program-controlled, and thus it is still possible for a crash which controls the execution of the unlocking routine to unlock the protected memory area. The hardware which recognizes the predetermined memory access cycles has no way of knowing that the software routine which controls them was entered into inadvertently. But protection is nevertheless afforded for two reasons. First, once the protect hardware determines that writing in the protected memory area is to be allowed, it permits only a limited number of such write operations. In the preferred embodiment of the invention, only a signal write cycle is allowed, and thus at most one piece of critical data may be destroyed following each crash.

Second, and more important, is the fact that it is only the write cycle which immediately follows the hardware unlocking that is permitted to access the protected memory area. The address range of the protected area is usually much smaller than that of the unprotected area. If the succeeding write cycle happens to access an address in the much larger unprotected memory area, than critical data will not be lost; and once this single write cycle takes place, subsequent write cycles in the protected memory area are inhibited. A crash allows at most one critical write, but if the specified address does not happen to be in the protected area (as it usually will not be), then no critical data will be lost.

Furter objects, features and advantages of the invention will become apparent upon consideration of the following detailed description in conjunction with the drawing which depicts the illustrative embodiment of the invention.

The illustrative CPU 10 is a Motorola 6800 microprocessor. In addition to numerous other pin connections (not shown), it is provided with a 16-bit address bus, an 8-bit data bus, a ∅2 clock pulse which goes high during any machine cycle (including memory access cycles), an R/W control line which is high during a read cycle and low during a write cycle, a VMA output which goes high when a valid address is present on the address bus, and a "power on reset" input line which is made to go low momentarily when power is first applied to the system.

Two types of memory (ROM and RAM, with the latter having protected and unprotected areas) are shown in the drawing. Ram 14 is the protected memory area referred to above. When its enable (EN) input goes high, this memory can operate. If at the same time the R/W input is high, a read cycle takes place, and if it is low a write cycle takes place. The hardware protect circuit to be described below prevents the R/W input from going low except during a single write cycle which follows detection of the predetermined "memory" access cycles. Address bus 32 and data bus 34 are extended between the CPU and the protected RAM. If the address on the data bus identifies a memory location in the protected RAM, then the data on the data bus will be written into the RAM during the allowed access. The R/W input is normally high so that read cycles in the protected RAM are always permitted; they take place whenever the RAM is enabled and a location in the RAM is addressed.

Unprotected RAM 16 operates in a similar manner, except that the R/W control line from the CPU is extended directly to it. Thus there are no restrictions placed on write cycles in RAM 16.

Read-only memory 30 is typically used for program storage, and no data can be written in it. Thus the ROM has an enable input, but no R/W control input.

Address bus 32 is extended to address decoder 12, the address decoder operating whenever VMA line 54 goes high. One of the upper three outputs of the address decoder goes high when the address on bus 32 is in one of the three respective address ranges of the three memories. An address decoder is used for decoding three predetermined addresses accessed by the unlocking software routine, as will be described below. Although in the illustrative embodiment of the invention the address decoder is also utilized to develop the enable signals for the memories, such external decoding is not necessary where the total memory address range is small and the memories themselves can accomplish address decoding by utilizing their chip select inputs, as is known in the art. Insofar as the present invention is concerned, the particular address decoding scheme for the memories is not important. The present invention does not concern how the three memories are accessed, but rather only when write cycles in the protected RAM can take place. Thus insofar as the present invention is concerned, in the illustrative embodiment thereof, it is primarily important to understand how the output of gate 36 is controlled.

The predetermined memory access cycles which control the hardware unlock can take many forms. As a minimum, at least one predetermined address should appear on the address but to unlock the protected RAM. This predetermined memory access cycles can be a read, in which case the unlocking hardware does nothing other than to check that the unlocking address appears on bus 32 (since nothing is actually read). It is better, however, for this at least one predetermined memory access cycle to be a write—which involves not only a predetermined address, but also predetermined data. In such a case, the unlocking hardware can perform an additional check; there is a greater assurance that the unlocking software routine has been entered into if not only a special unlocking address appears on the address bus, but also special unlocking data appears on the data bus.

It should also be noted that while the unlocking circuitry detects a proper sequence of addresses on the address bus to unlock the protected RAM, memory locations may actually be accessed, since the address buses are extended to the memories and the addresses required by the unlocking hardware may actually be within the address ranges of the memories. But that is of no moment. If the unlocking address codes are outputted by the CPU during read cycles, the data read from the memories is simply ignored. Alternatively, if write cycles are employed in the unlocking software routine, data may be written in the unprotected RAM during the unlocking procedure. That, too, is of no moment because in such a case the respective memory locations would not be used for any other purpose. It is even possible for some of the addresses employed in the unlocking routine to be those which access the protected RAM (although that is not the case in the illustrative embodiment of the invention). Since nothing can be written in the protected RAM during the unlocking procedure itself (a single write is allowed in the protected RAM only at the termination of the unlocking procedure), the appearance on the address bus of an address within the protected RAM has no effect even during a write cycle since the R/W input of the protected RAM remains high.

In the illustrative embodiment of the invention, the unlocking procedure entails three write cycles, at three predetermined hexadecimal addresses—$8780, $8790, and $87A0. (The symbol $ represents a hexadecimal address.) In addition, while the writes to the last two addresses do not require any particular data, the hardware unlocks only if a data byte is outputted by the CPU during a write to address $8780 which includes a bit of value 1 in bit position 2 (D1) of the data bus. During this write cycle, the bit values on data lines D0 and D2-D7 are of no moment. (It should be recognized, however, that it is possible to provide for still additional verification by requiring that a particular predetermined byte appear on the data bus during the write to address $8780, and even the other two predetermined addresses.)

When the "power on reset" input of CPU 10 is pulsed low by the "power on reset circuit" 50 (any conventional circuit may be used), the pulse is also applied to the preset input of JK flip-flop 18. Thus when the system is first turned on, the low signal at the preset input sets the flip-flop in the 1 state with the $\overline{Q}$ output going low. This output is connected to the clear input of JK flip-flop 24, whose Q output is thus held low. Since this output is connected to one input of gate 36, the gate output remains high to inhibit writes in the protected RAM.

When the CPU enters the software unlocking routine, it first controls a write cycle at address $8780, with a data byte which includes a bit of value 1 in bit position D1. Data line D1 is extended to the D input of D-type flip-flop 22. When address decoder 12 decodes address $8780, it applies a positive potential to one input of gate 52. The $\emptyset$2 pulse is applied to the other input, and thus the gate output goes low. When the $\emptyset$2 pulse terminates (by which time the data lines are stable), the gate output goes high, and the positive step clocks flip-flop 22. The flip-flop is thus set and its Q output goes high. This controls one input of gate 20 to go high. Another input of gate 20 is connected to the $\emptyset$2 clock output of the CPU which goes high and low during every machine cycle. Still a third input to the gate, that connected to the output of inverter 42, goes high during all write cycles when the R/$\overline{W}$ output of the CPU is low and the output of the inverter is thus high. But the output of gate 20 remains low because its fourth input is connected to an output of the address decoder which remains low. The net effect of the first write cycle of the unlocking routine, therefore, is simply to cause the Q output of flip-flop 22 to go high; it remains high to enable one input of gate 20 even after termination of the write cycle. The output of the flip-flop must remain high until the third predetermined write cycle of the unlocking routine takes place in order to enable an access to the protected RAM; it will remain high provided that in the interim another write to address $8780 does not take place with a data byte whose D1 bit has a value of 0.

The $\emptyset$2 and the inverted R/$\overline{W}$ signals are both extended to the two inputs of gate 38. Thus during every write cycle the output of gate 38 goes high and, at the trailing edge of the pulse at the output of the gate, flip-flop 18 is clocked. One input of gate 40 is connected to an output of the address decoder which goes high only during a memory cycle which accesses address $8790. Thus the output of gate 40 is ordinarily low. With the J and K inputs of flip-flop 18 both low, the clocking of flip-flop 18 results in no change in state; the $\overline{Q}$ output remains low so that the Q output of flip-flop 24 remains low. But when address $8790 is applied to the address bus during the second write cycle of the unlocking routine, the address decoder enables one input of gate 40. Since this address is outputted during a write cycle, inverter 42 enables the other input and the output of gate 40 goes high. At the end of the write cycle, the CPU causes of $\emptyset$2 pulse to go low shortly before the R/$\overline{W}$ output returns to its normally high state. Thus the output of gate 38 falls and clocks flip-flop 18 while the output of gate 40 is still high. With a low potential at the J input and a high potential at the K input, the flip-flop is placed in the 0 state and its $\overline{Q}$ output goes high. This releases the clear input of flip-flop 24 which is now allowed to change state. The first two write cycles thus control enabling one input of gate 20 and the release of flip-flop 24 so that it can be set. It does not matter which of the write cycles just described occurs first, as long as they both take place before the third predetermined memory access cycle of the unlocking routine.

The third predetermined memory access cycle is a write to address $87A0; as with the write to address $8790, the data which appears on the data bus is not important. During this third write cycle, address decoder 12 enables the uppermost input of gate 20. The second input is still enabled by the Q output of flip-flop 22, and the two other gate inputs are enabled by the $\emptyset$2 clock pulse and the R/$\overline{W}$ write pulse. The output of gate 20 thus goes high and at the trailing edge of the pulse flip-flop 24 is clocked. Now that the clear input of the flip-flop is not held low, the high potential at the J input and the low potential at the K input result in the setting of the flip-flop and the Q output going high.

The Q output is extended to one input of gate 36 as described above. The gate is thus enabled so that its output goes low on the next write cycle, when the output of inverter 42 goes high. Thus if this next write cycle controls an access to an address in the protected RAM, the byte on the data bus will be written at the addressed location. If the addressed location is not in the protected RAM, the RAM will not be enabled and nothing will be written even though its R/$\overline{W}$ input is pulsed low. (It should be noted that the third write cycle of the unlocking routine terminates, with the output of inverter 42 going low, before flip-flop 24 is set in the 1 state. Thus gate 36 is enabled only after the cycle is over, so that it is only during the next write cycle that a write can take place in the protected RAM.)

Only a single write cycle is permitted following unlocking. Thus it is necessary to somehow cause the Q output of flip-flop 24 to go low after the single allowed write cycle. This is controlled automatically simply by connecting the Q output of flip-flop 24 to the J input of flip-flop 18. Gate 40 is not enabled by the address decoder and thus its output, the K input of flip-flop 18, remains low during the allowed write cycle. (For this reason, address $8790 should not be within the address range of the protected RAM.) Because the J input is high, at the trailing edge of the $\emptyset$2 pulse, the output of gate 38 goes low and the flip-flop is clocked. The $\overline{Q}$ output now goes low and once again clears flip-flop 24. Thus the hardware is restored to its initial locked state, after having allowed only a single write cycle. Flip-flops 18 and 24 are both restored to their original conditions during the write cycle which immediately follows unlocking, whether or not it is the protected RAM which is actually accessed. Thus even in the case of a crash and the execution of the unlocking routine which allows a single write to the protected RAM, data will be lost only if it is this RAM which is addressed during the allowed write cycle.

Although flip-flops 18 and 24 are thus restored, flip-flop 22 is still set. It is reset at the end of the unlocking routine by performing a write to address $8780 with a data byte whose D1 bit is a 0. Just as the flip-flop was originally set, it is now reset and its Q output goes low to fully restore the hardware to its initial condition. (If this step is not taken, then subsequent unlocks of the protected RAM will occur if writes are made to addresses $8790 and $87A0 without requiring a write to address $8780.)

Rather than to use separate flip-flops and gates in the manner described, in some systems it is possible to reduce the hardware required. For example, in the case of a multiplexer, suppose that a USART is employed for other purposes and its DTR output is available for any required use. In such a case, flip-flop 22 would not be required. The first predetermined memory access could be accomplished by a setting of the DTR bit of the USART (having address $8780) in the 1 state, the DTR output being extended to gate 20. At the end of the unlocking software routine, the USART would be accessed once again, and this time its DTR output would be turned off. It should be noted that in such a system, it would only be addresses $8790 and $87A0 which are "fictitious", address $8780 addressing the USART not only in connection with the unlocking of the protected RAM but also for controlling the normal operation of the multiplexer.

In the illustrative embodiment of the invention, the following subroutine (WRCMOS—writes to CMOS protected RAM) controls the unlocking procedure:

```
; PRIOR TO ENTRY INTO UNLOCK PROCEDURE,
DATA TO BE
; WRITTEN IS IN ACC. A AND WRITE ADDRESS
IS IN X REGISTER
WRCMOS  LDA  B  #$02   ;LOAD AC. B W/1
                       IN BIT POS. D1
        STA  B  $8780  ;SET F/F 22 (WRITE KEY 1)
        STA  B  $8790  ;SET F/F 18 (WRITE KEY 2)
        STA  B  $87A0  ;SET F/F 24 (WRITE KEY 3)
        STA  A  0,X    ;WRITE DATA
        LDA  B  #$00   ;LOAD ACC. B W/0
                       IN BIT POS. D1
        STA  B  $8780  ;RESET F/F 22
        RTS            ;RETURN
```

This assembly language routine is designed for use in the 6800 microprocessor. The initial comment explains that during normal operation, before the subroutine is even called, the address to be accessed in the protected RAM is loaded in the X register, and the data to be written is loaded in accumulator A.

The subroutine first loads accumulator B (in the immediate mode) with byte $02; this is a data byte which has a 1 in bit position D1, as required to set flip-flop 22. The next instruction controls the storing of the byte in accumulator B at address $8780, i.e., flip-flop 22 is set as described above.

The next two write operations control the storing of the data in accumulator B at addresses $8790 and $87A0. As described above, in the illustrative embodiment of the invention, the actual data outputted on the data bus is not important during these write cycles, and the same data byte is outputted during all three "write key" operations.

After the first four instructions are executed, the protected RAM is unlocked for a single write cycle. (In the illustrative embodiment of the invention, although this need not necessarily always be the case, intervening reads are disregarded. But a system could be designed such that even a read cycle following the fetching of the next instruction results in the protected RAM locking once again.) The fifth instruction causes the previously loaded data in accumulator A to be stored at the address contained in the X register.

After the write, flip-flop 22 must be reset. This is controlled by first loading byte $00 in accumulator B, and then storing the contents of accumulator B at address $8780. A return is then made from the subroutine to whatever processing was in progress.

Although the invention has been described with reference to a particular embodiment, it is to be understood that this embodiment is merely illustrative of the application of the principles of the invention. For example, the techniques of the invention are just as applicable to protection against accesses to elements other than memories, e.g., latches, I/O devices, and peripheral devices in general. In such a case, accesses to the element to be protected would be allowed only if a gate comparable to gate 36 is operated. Furthermore, while the unlocking routine in the illustrative embodiment of the invention entails predetermined memory access cycles, that is because all accesses—even to I/O devices—are "memory accesses" with microprocessors which have memory-mapped I/O, such as the 6800 device. Other microprocessors, such as the 8080 and Z80, distinguish between memory addresses and I/O addresses, with the I/O address range being much smaller than the memory address range and with a control line being provided for distinguishing between the two types of access cycle. If such a microprocessor is employed, any predetermined access cycles, even those to I/O devices, may be utilized as the unlocking "keys" for the elements to be protected. Thus it is to be understood that numerous modifications may be made in the illustrative embodiment of the invention and other arrangements may be devised without departing from the spirit and scope of the invention.

What I claim is:

1. A memory protect system for a read/write memory having an area containing critical data which is to be protected; said memory having extended thereto, and being included in an overall system which has, address and data buses, and control means for accessing said memory; comprising hardware means responsive to and for registering the occurrence of at least one predetermined access cycle in which a predetermined unlocking address appears on said address bus; hardware means for locking said critical data memory area by preventing write operations in the absence of the prior registering of the occurrence of said at least one predetermined access cycle in which said predetermined unlocking address appears on said address bus; and hardware means for unlocking said critical data memory area by allowing write operations only for a predetermined number of other access cycles which are subsequent to the registering of the occurrence of said at least one predetermined access cycle, each of such allowed write operations being at an address different from said predetermined address.

2. A memory protect system in accordance with claim 1 further including means for inhibiting write operations in said critical data memory area in the absence of a prior enabling write access cycle having a respective predetermined address with predetermined data.

3. A memory protect system in accordance with claim 2 further including means for controlling said inhibiting means to inhibit write operations in said critical data memory area following a disabling write access cycle having said respective predetermined address with different predetermined data.

4. A memory protect system in accordance with claim 3 wherein said predetermined number is one.

5. A memory protect system in accordance with claim 3 wherein said read/write memory includes an unprotected area, and further including means for enabling write operations in said unprotected area independent of the operations of said registering and allowing means.

6. A memory protect system in accordance with claim 5 wherein said at least one predetermined access cycle is to said unprotected area.

7. A memory protect system in accordance with claim 1 wherein said allowing means allows only a single write operation in said critical data memory area following each registering of said at least one predetermined access cycle.

8. A memory protect system in accordance with claim 1 wherein said read/write memory includes an unprotected area, and further including means for enabling write operations in said unprotected area independent of the operations of said registering and allowing means.

9. A memory protect system in accordance with claim 8 wherein said at least one predetermined access cycle is to said unprotected area.

10. A memory protect system in accordance with claim 9 wherein said at least one predetermined access cycle is a write cycle.

11. A memory protect system in accordance with claim 8 wherein said allowing means allows only a single write operation in said critical data memory area following each registering of said at least one predetermined access cycle.

12. A data processing system in which critical elements are protected against erroneous accesses comprising a plurality of elements which may be accessed by respective address signals, at least one of said elements to be protected against erroneous accesses; control means for accessing said elements; hardware means responsive to and for registering the occurrence of at least one predetermined access cycle which accesses a predetermined address by predetermined address signals; hardware means for locking said at least one element by preventing operation of said control means thereon in the absence of the prior registering of the occurrence of said at least one predetermined access cycle; and hardware means for unlocking said at least one element by allowing an access thereto only for a predetermined number of other access cycles which are subsequent to the registering of the occurrence of said at least one predetermined access cycle, said at least one element being accessed at an address different from said predetermined address.

13. A data processing system in accordance with claim 12 wherein said control means is program-controlled and operative to access said at least one element upon execution of a particular program routine; said particular program routine controlling said at least one predetermined access cycle and then accessing said at least one element at an address which is pre-set prior to execution of said particular program routine.

14. A data processing system in accordance with claim 13 wherein said at least one predetermined access cycle includes at least two access cycles, each having a different predetermined address.

15. A data processing system in accordance with claim 13 further including means for enabling accesses to those of said elements which are not to be protected independent of the operations of said registering and allowing means.

16. A data processing system in accordance with claim 13 wherein said at least one predetermined access cycle includes a write cycle.

17. A data processing system in accordance with claim 12 wherein said allowing means allows only a single succeeding access to take place to said at least one element following each registering of said at least one predetermined access cycle.

18. A data processing system in accordance with claim 12 further including means for enabling accesses to those of said elements which are not to be protected independent of the operations of said registering and allowing means.

19. A data processing system in accordance with claim 12 wherein said at least one predetermined access cycle includes at least two access cycles, each having a different predetermined address.

20. A data processing system in accordance with claim 12 further including means for inhibiting write operations in said critical elements in the absence of a prior enabling write access cycle to a predetermined element with predetermined data.

21. A data processing system in accordance with claim 21 further including means for controlling said inhibiting means to inhibit write operations in said critical elements following a disabling write access cycle to said predetermined element with different predetermined data.

* * * * *